United States Patent [19]
Moser et al.

[11] 3,865,980
[45] Feb. 11, 1975

[54] LOADING COIL MEANS FOR MULTI-CONDUCTOR CABLE

[75] Inventors: Jessie Lee Moser, Highpoint; Robert Philmore Reavis, Jr., Statesville; Melvin Andrew Soderstrom, Advance, all of N.C.

[73] Assignee: AMP Incorporated, Harrisburg, Pa.

[22] Filed: Feb. 27, 1974

[21] Appl. No.: 446,436

[52] U.S. Cl. .................. 178/46, 333/1, 333/97 R
[51] Int. Cl. .... H01f 15/02, H01f 15/12, H01f 17/08
[58] Field of Search ............ 178/45, 46; 336/65, 90, 336/185; 174/70 R; 333/1, 6, 97 R

[56] References Cited
UNITED STATES PATENTS

| | | | |
|---|---|---|---|
| 2,079,697 | 5/1937 | Ranges | 178/46 |
| 2,548,206 | 4/1951 | Drom | 178/46 |
| 3,526,712 | 9/1970 | Drom | 178/46 |

Primary Examiner—James W. Lawrence
Assistant Examiner—Marvin Nussbaum
Attorney, Agent, or Firm—F. W. Raring; J. L. Seitchik; W. J. Keating

[57] ABSTRACT

Loading coil assembly for a multi-conductor assembly comprises a plurality of spaced-apart trays positioned on the cable and coil housings mounted between the trays. Each coil housing contains a plurality of loading coils. The conductors from the cable extend between the trays and to a connecting means on the housing which connects the cable conductors to the leads from the coils.

5 Claims, 6 Drawing Figures 3,865,980

LOADING COIL MEANS FOR MULTI-CONDUCTOR CABLE

BACKGROUND OF THE INVENTION

It is sometimes desirable in the telephone industry to connect a loading coil in series with each of the pairs of conductors in the cable intermediate the ends of the cable. This is commonly done by means of a loading coil assembly comprising a short section of a multi-conductor cable having twice as many pairs of wires therein as the cable on which it is to be installed and having a multiplicity of inductance coils mounted in surrounding relationship to the short section of cable. The conductors in the short section of cable are connected to the appropriate leads of the coils and the ends of the conductors in the short section of cable are spliced to the conductors in the through cable. A variety of methods of mounting the inductance coils adjacent to the short section of cable are known to the art; for example, see U.S. Pat. Nos. 3,134,854, 2,079,697 and 3,691,294. It will be apparent from a review of the disclosures of these prior art patents that the mounting of a multiplicity of small coils in surrounding relationship to a cable presents a variety of problems as regards, for example, connecting the conductors in the short section of cable to the leads of the coils, supporting the coils adjacent to the cable, and finally, servicing the assembly in the event that one or more of the coils must be replaced.

The present invention is directed to the achievement of an improved loading coil assembly in which the inductance coils are mounted in surrounding relationship to the cable in a manner such that a large number of coils can be provided in a limited space. The invention further provides an improved means for connecting the conductors in the short cable section to the leads from the coils which permits the conductors in the short section of cable to be readily connected to the coils and in the event of servicing, the conductors can be readily disconnected and connected to a replacement coil.

It is accordingly an object of the invention to provide an improved loading coil assembly for multiconductor cables. A further object is to provide a coil assembly which is relatively compact so that a large number of coils can be mounted in a confined space. A further object is to provide a loading coil assembly having improved means for connecting the conductors of the cable to the leads from the coils and which thereby permits rapid assembly of the loading coils to the conductors. A further object is to provide a loading coil assembly which can be supplied in a wide variety of sizes dependent upon the number of conductors in the cable.

These and other objects of the invention are achieved in preferred embodiments thereof, which are briefly described in the foregoing abstract, which are described in detail below, and which are shown in the accompanying drawing in which.

Figure 2:
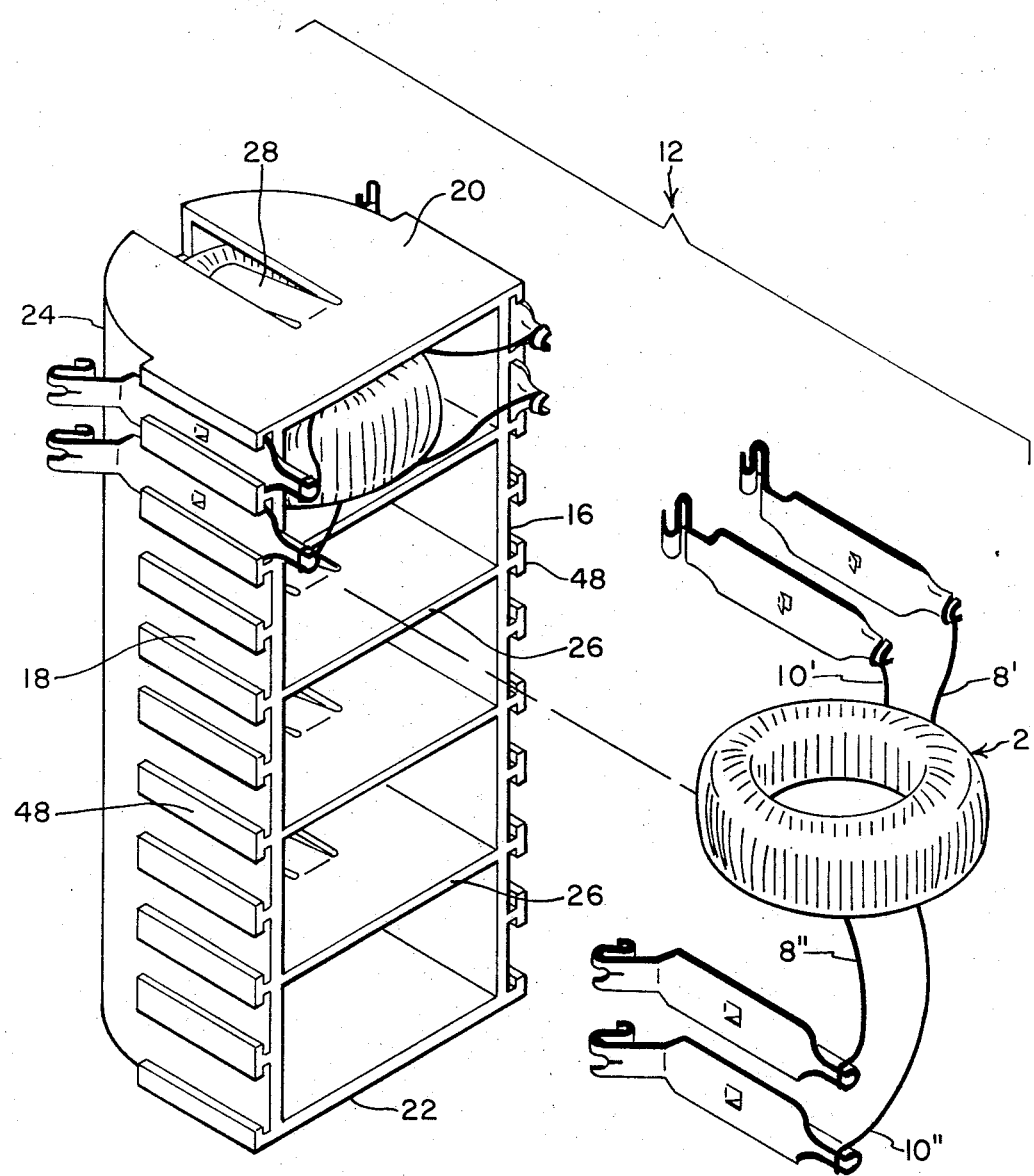
FIG. 2 is a perspective view of a single coil housing forming part of the invention having a typical inductance loading coil exploded from one of the cells thereof.
Figure 5:
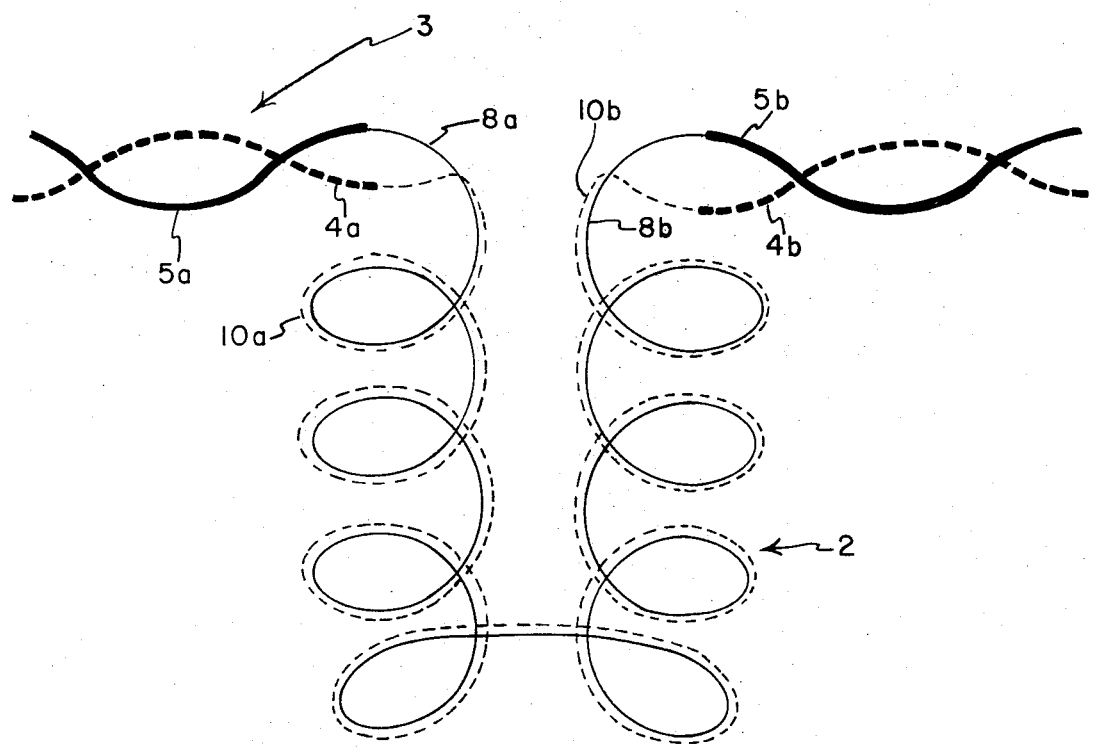
FIG. 5 is a schematic representation of the manner of connecting the conductors in the cable to the conductors in the coil.
Figure 4:
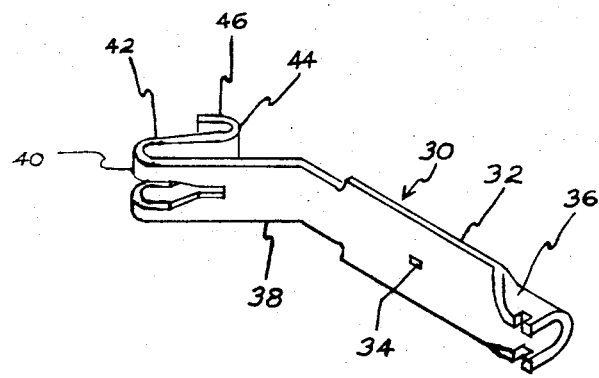
FIG. 4 is a perspective view of a contact terminal or connecting device used to connect the leads from the coils to the conductors from the cable.

Referring first to FIG. 5, it is sometimes desirable to connect the conductors 4, 5 of a twisted pair 3 of conductors in a telephone cable to a toroidal coil of the type shown at 2 in FIG. 2. Each coil comprises two windings indicated at 8 and 10 in FIG. 5 which are wound in the form of a single toroid so that coil has four leads indicated at 8a, 10a, 8b, 10b. The coil is connected to the twisted pair 3 of conductors by connecting the conductor 4a to the lead 10a, connecting the conductor 5a to the lead 8a, connecting the conductor 5b to the lead 8b, and connecting the conductor 4b to the lead 10b. As shown in FIG. 2 the four leads 8a, 10a, 8b, 10b of the coil 2 are actually located relatively close to each other but on opposite sides of the coil.

Figure 6:
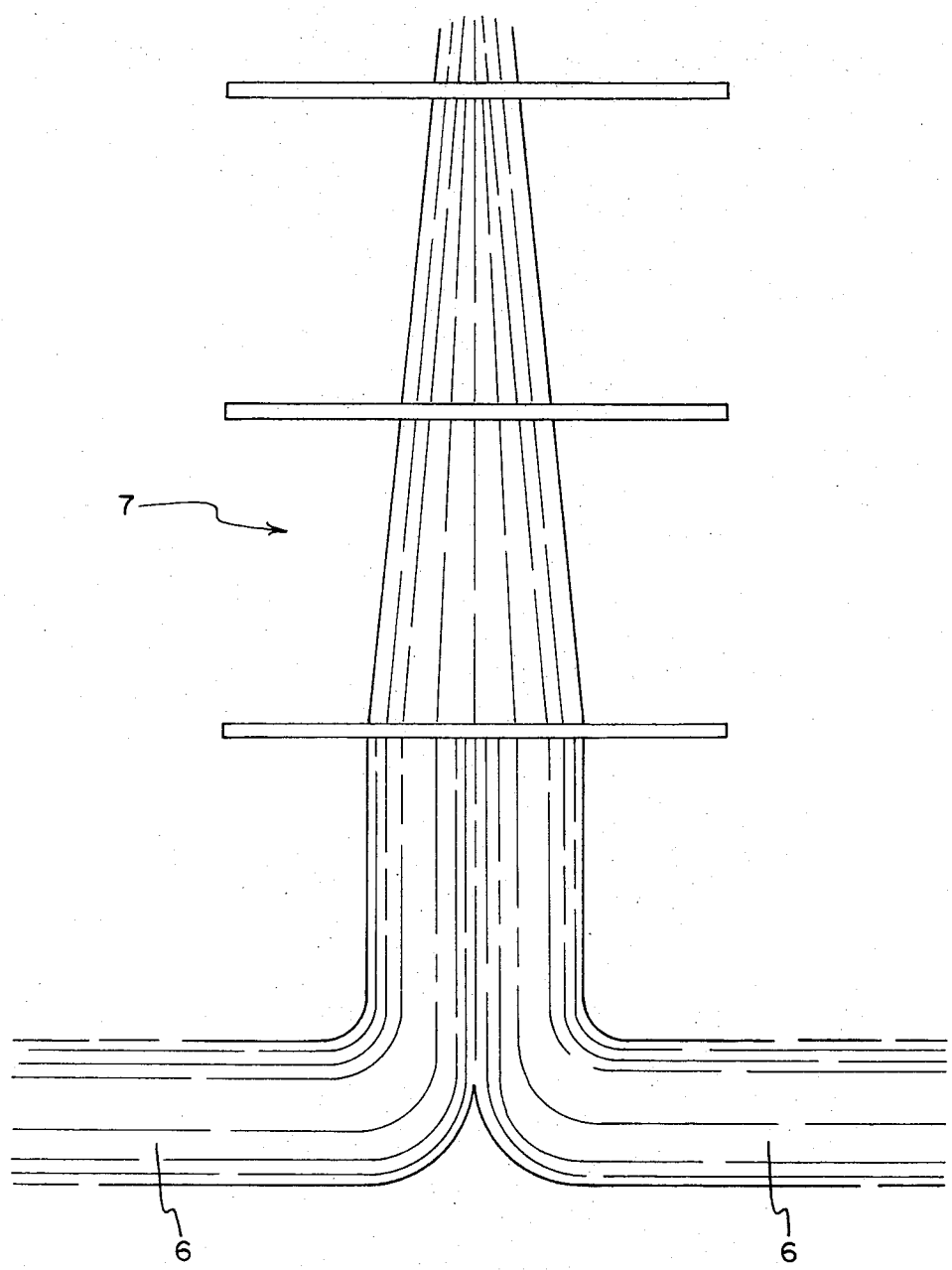
FIG. 6 is a diagramatic view of the manner in which the loading coil assembly is connected to a multi-conductor cable.

Referring now to FIG. 6, when it is necessary to install loading coils on the conductors of the cable 6, the cable is first cut and the cut ends are connected to the conductors 9 in a loading coil assembly 7 which is manufactured in a factory and installed on the cable at the work site. The assembly 7 comprises a short cable section 9 containing at its base, as viewed in FIG. 6, twice as many conductors as there are in the cable 6. The conductors are led laterally from this short section 9 of cable and are connected to the leads of coils 2 so that the upper end of the assembly 7, all of the conductors in the cable section 9 will have been connected to coils 2 in the assembly. Thus, a given pair of conductors in the cable 6 will thus extend from one side of the cable into the assembly 7, through a single coil 2 in the assembly, and then back into the cable 6.

Figure 1:
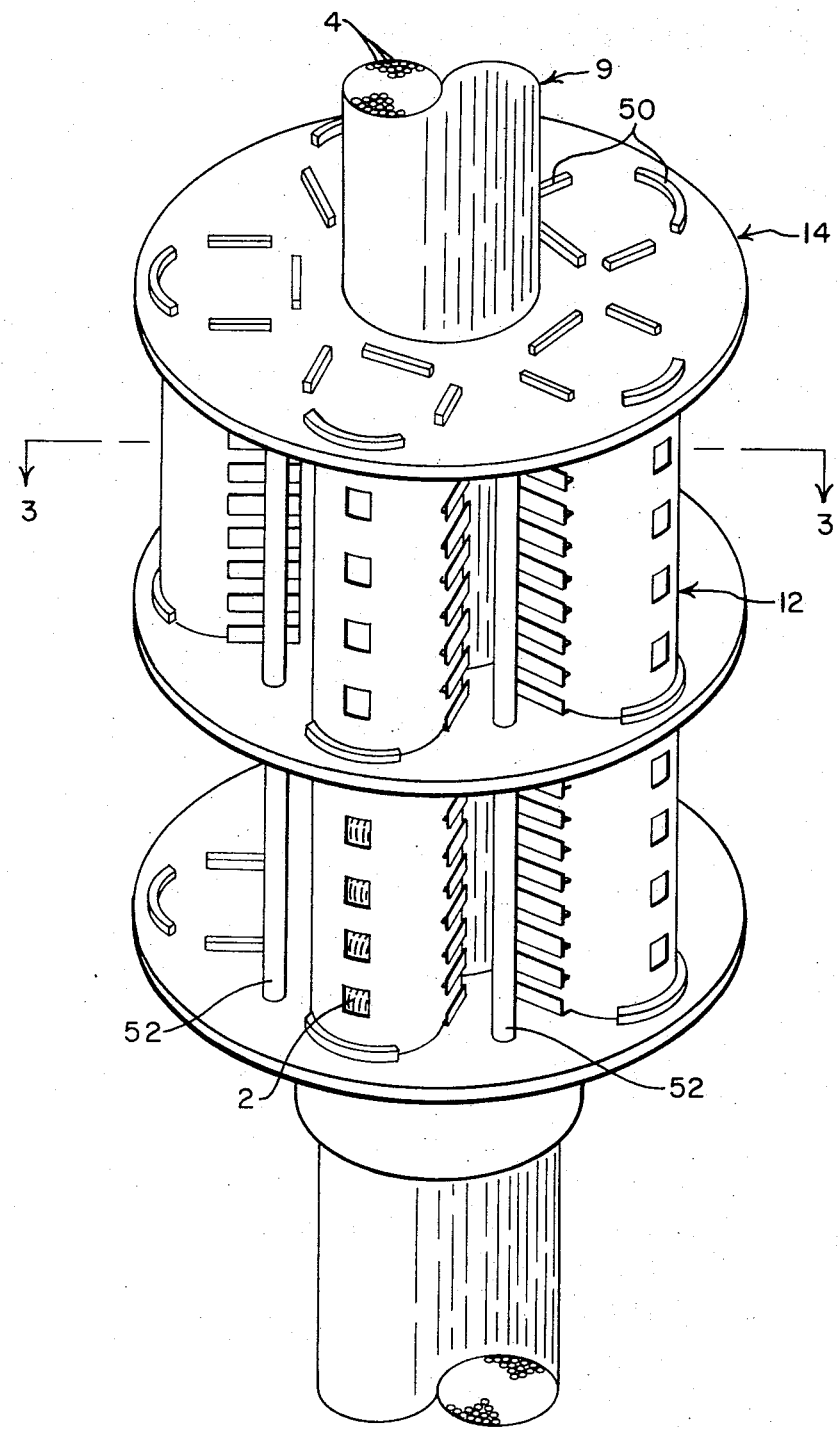
FIG. 1 is a perspective view of a preferred form of loading coil assembly in accordance with the invention.
Figure 3:
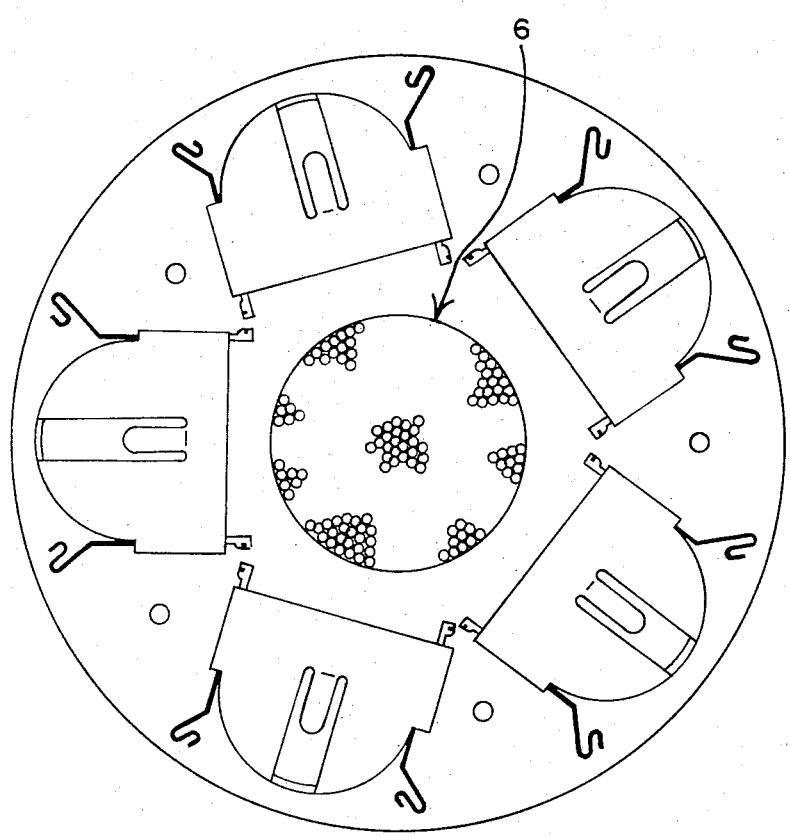
FIG. 3 is a cross-sectional view taken along the lines 3—3 of FIG. 1.

Referring now to FIGS. 1–4, the leads of the coils 2 are connected to the conductors in the cable section 9 and the coils are supported in surrounding relationship through the cable section 9 by means of a plurality of circular trays 14 and a plurality of coil housings 12 mounted in the manner shown in FIGS. 1 and 3 and described more fully below. Each tray 14 comprises a flat plate-like member having a central opening. The trays 14 are mounted in parallel spaced-apart relationship on the cable section 9 with the cable section extending through the central openings in the trays. The trays 14 are held in the desired ppositions on the cable by means of rods 52 which extend through aligned openings in the trays and which are secured to the trays in any suitable manner.

The housings 12 are advantageously of a suitable plastic material which can be readily molded and comprise parallel sidewalls 16, 18 and parallel end walls 20, 22. The sidewalls are curved inwardly and towards each other to form a backwall as shown at 24. A plurality of parallel spaced apart barrier walls 26 extend between the sidewalls 16, 18 to define a plurality of individual cells, each of which is adapted to receive a single coil 2 as shown in FIG. 2.

The leads from the coils 2 are connected to the conductors in cable section 9 by means of connecting devices 30 (FIG. 4) each of which comprises a flat central mounting section 32 having a retaining boss 34 struck from its underside and having folded portions 36 at one end thereof around which the coil leads 8, 10 are adapted to be wrapped and to which the coil leads are soldered. A plate-like section 38 extends obliquely from the other end of the central mounting section 32 and is reversely bent at 40 to define a second plate-like section 42. This second plate-like section is reversely bent at 44 and a third section 46 extends parallel to the central section 42. This third section functions as a cutter bar in cooperation with an insertion tool when a conductor from a cable is inserted into the aligned slots in the plate-like sections 38, 42 as fully described in U.S. Pat. No. 3,628,202. The slots in the plate sections 38, 42 are of a width such that edges of the slots penetrate the insulation of the wire and establish electrical contact therewith.

The connecting devices 30 are mounted against the sides 16, 18 of the housing 12 by means of T-shaped projections 48 on the sides of the housing. As shown in FIG. 2, these projections are dimensioned such that the central mounting portions 32 of the connecting devices have a snug fit between adjacent projections and the bosses 34 on the undersides of the mounting portions dig into the sidewalls 16, 18 and prevent removal of the connecting devices from the housing.

The individual coils are assembled to the housings 12 by merely sliding them into the cells from the open ends thereof. Lances 28 are formed in the top wall 20 and in the barrier walls 26 and lodge in the central openings in the toroidal coils to prevent them from falling out after insertion. The leads 8a, 10a, 8b, 10b of the coils are wrapped around the end portions 36 of the connecting devices adjacent to the coil and soldered thereto. Thereafter, the required number of housings 12 are assembled to the cable section 9 as shown in FIG. 1. That is, the appropriate number of housings are positioned on a tray, an additional tray is moved against the upper ends of the housings and another layer of housings is positioned on the second tray. This procedure is carried out until a desired number of coils have been mounted on the cable section and all of the conductors in the cable section have been connected to coils. As shown in FIG. 1, the trays have positioning bosses 50 on their upper and lower sides wich receive the end walls, 20, 22 of the housings and position them accurately at equally spaced intervals. As shown in FIG. 3, the housing 12 are assembled to the trays with the open sides of the cells facing the conductors of the cable section 9 so that the conductor-receiving plate sections 38, 42 of the connecting devices will be accessible for assembly purposes.

The conductors from the cable section 9 are then withdrawn and led laterally outwardly to the ends of the connecting devices inserted in to the slots in the platesections 38, 40. At the time of insertion, the excess wire of each conductor is trimmed by the cooperative action of the insertion tool and the cutter bar 46. After the loading coil assembly 7 has been completed, it is carried to the point of use and the lower ends of the conductors in the cable section 9 are spliced in a conventional manner to the conductors in cable 6 as shown in FIG. 6.

A significant advantage of the invention is that the conductors in the cable section 9 can be readily connected to the coils by simply inserting these conductors into the slots of the connecting devices 30 as explained above. Other advantages include the high density of packing of the coils which is available and the ease with which a defective coil can be removed and replaced or other wiring changes can be made. It will be understood that the assembly as shown in FIG. 1, will in use, be surrounded by a suitable housing.

Changes in construction will occur to those skilled in the art and various apparently different modifications and embodiments may be made without departing from the scope of the invention. The matter set forth in the foregoing description and accompanying drawings is offered by way of illustration only.

What is claimed is:

1. In combination with a short section of a multi-conductor cable comprising a plurality of pairs of associated conductors, a loading coil assembly for connecting a coil to each of said pairs, said loading coil assembly comprising:

a plurality of supporting trays, each of said trays comprising a plate-like member having a central opening, said trays being mounted in spaced-apart relationship on said short section of cable with said cable extending through said central openings, a plurality of coil housings, each of said housings having a plurality of coil receiving cells, said cells being arranged in a single row, each of said cells having a coil containaed therein, each of said housings being mounted between adjacent trays with said rows extending parallel to the axis of said cable, each of said housings having opposite ends, said ends of each housing being supported by the opposed faces of adjacent trays, each of said housings having laterally opposite facing sides extending between said ends, electrical connecting means mounted on said sides for each coil, said cable conductors extending laterally from said cable and being connected to said connecting means, and the lead wires from said coils extending from said coils and being connected to said connecting means whereby each of said conductors in said short section of cable in connected to one of said coils.

2. The combination set forth in claim 1, each of said cells having an open side which faces radially with respect to the axis of said cable and towards said cable.

3. The combination set forth in claim 2, each of said connecting means comprising a sheet metal connecting device having a central mounting section and having a first end disposed proximate to said cable and having a second end which is disposed proximate to said open side of its associated cell, one of said cable conductors being connected to said second end and one of said coil leads being connected to said first end.

4. The combination set forth in claim 3, each of said connecting devices having on said second end thereof a plate-like means having a conductor-receiving slot therein, said cable conductor being disposed in said slot.

5. A loading coil assembly which is adapted to be installed on a multi-conductor cable, said coil assembly comprising:

a short section of multi-conductor cable having a number of conductors therein which is twice the number of conductors in said cable, a plurality of trays mounted on said short section of cable, each of said trays having a central opening, said trays being in parallel spaced-apart relationship on said short section with said short section extending through said openings, a plurality of coil housings, each of said housings having a plurality of coil-receiving cells, said cells being arranged in a single row, each of said cells having a coil therein, said housings being contained between adjacent trays with said rows extending parallel to the axis of said short section of cable, and said conductors in said short section of cable extending radially outwardly from said cable and being connected to said coils whereby, upon cutting said through cable and connecting the cut ends of the conductors in said through cable to the conductors in said short section of cable, said coils are connected to said conductors in said through cable.

* * * * *